US010046631B2

(12) United States Patent
Porter et al.

(10) Patent No.: US 10,046,631 B2
(45) Date of Patent: Aug. 14, 2018

(54) COVER FOR A UTILITY VEHICLE

(71) Applicant: Proform Plastics Limited, Tauranga (NZ)

(72) Inventors: Andrew Porter, Hamilton (NZ); Philip Butler, Cambridge (NZ)

(73) Assignee: Proform Plastics Limited, Tauranga (NZ)

( * ) Notice: Subject to any disclaimer, the term of this patent is extended or adjusted under 35 U.S.C. 154(b) by 0 days.

(21) Appl. No.: 15/299,552

(22) Filed: Oct. 21, 2016

(65) Prior Publication Data

US 2017/0113526 A1    Apr. 27, 2017

(30) Foreign Application Priority Data

Oct. 22, 2015  (NZ) .......................... 713553

(51) Int. Cl.
| | |
|---|---|
| *B60P 7/02* | (2006.01) |
| *B60J 7/16* | (2006.01) |
| *B62D 33/04* | (2006.01) |
| *B62D 29/04* | (2006.01) |
| *B62D 29/00* | (2006.01) |

(52) U.S. Cl.
CPC .......... *B60J 7/1621* (2013.01); *B62D 29/008* (2013.01); *B62D 29/04* (2013.01); *B62D 33/04* (2013.01)

(58) Field of Classification Search
CPC ...... B29C 66/71; F21V 29/74; F21Y 2115/10; C08L 67/00; C08L 67/025; H05K 7/1497; H05K 7/20745; H05K 7/20836; H05K 7/20736; G06F 1/20

USPC ................................................ 296/100.06
See application file for complete search history.

(56) References Cited

U.S. PATENT DOCUMENTS

| 4,079,989 A   * | 3/1978  | Robertson | B60P 7/0807 296/100.07 |
| D335,077 S    * | 4/1993  | Haney     | D8/387                 |
| 6,227,602 B1  * | 5/2001  | Bogard    | B60J 7/141 296/100.06  |
| 6,447,045 B1  * | 9/2002  | Dickson   | B60J 7/1621 180/69.21  |
| 6,488,329 B1  * | 12/2002 | Smith     | B60J 7/1621 296/100.01 |
| 6,505,875 B1  * | 1/2003  | Laper     | B60J 7/1621 296/100.06 |
| 6,547,310 B2    | 4/2003  | Myers     |                        |
| 7,252,322 B2  * | 8/2007  | Rusu      | B60J 7/1621 296/100.07 |

(Continued)

*Primary Examiner* — Kiran B Patel
(74) *Attorney, Agent, or Firm* — LeonardPatel PC; Michael Aristo Leonard, II; Sheetal Suresh Patel

(57) ABSTRACT

A cover for the deck of a utility vehicle may be formed from a single shell of thermoplastics material and reinforced with an extrusion that, by virtue of being formed in aluminum or another suitable material, has a lower co-efficient of expansion relative to the shell. The two parts of the cover, shell and extrusion, may be secured in such a way that there can be some degree of independent movement between them. Effectively, limited thermal expansion of the shell is allowed without overly compromising the connection between it and the aluminum extrusion. A flexible extrusion may connect the cover to the utility vehicle at one end and act as a hinge such that as it is raised, it is not only displaced in a vertical orientation, but also in a horizontal direction.

15 Claims, 4 Drawing Sheets

(56) References Cited

U.S. PATENT DOCUMENTS

| | | | | |
|---|---|---|---|---|
| 7,258,387 B2* | 8/2007 | Weldy | ............ | B60J 7/08 |
| | | | | 296/100.04 |
| 7,278,674 B1* | 10/2007 | Bogard | ............ | B60J 7/1621 |
| | | | | 296/100.06 |
| 7,770,526 B2* | 8/2010 | Drager | ............ | F16J 13/18 |
| | | | | 105/377.05 |
| 8,641,124 B1* | 2/2014 | Yue | ............ | B60J 7/141 |
| | | | | 296/100.09 |
| 2001/0035664 A1* | 11/2001 | Steffens | ............ | B60J 7/141 |
| | | | | 296/100.09 |
| 2004/0245799 A1* | 12/2004 | Rusu | ............ | B62D 25/10 |
| | | | | 296/100.06 |
| 2006/0108826 A1* | 5/2006 | McClure | ............ | B60R 5/04 |
| | | | | 296/100.07 |
| 2006/0119127 A1* | 6/2006 | Landrith | ............ | B60J 7/041 |
| | | | | 296/100.04 |
| 2007/0096499 A1* | 5/2007 | Zajicek | ............ | B60J 7/1621 |
| | | | | 296/100.06 |
| 2018/0043759 A1* | 2/2018 | Rohr | ............ | B60J 7/1621 |

\* cited by examiner

COVER FOR A UTILITY VEHICLE

CROSS REFERENCE TO RELATED APPLICATION

This application claims the benefit of New Zealand Provisional Patent Application No. 713553 filed on Oct. 22, 2015. The subject matter of this earlier filed application is hereby incorporated by reference in its entirety.

FIELD

The present invention generally relates to vehicle covers, and more particularly, to a cover for a utility vehicle. The invention may particularly apply to rigid covers for utility vehicles and manufacture of the same.

BACKGROUND

Many vehicles, such as utility vehicles (also known as pickup trucks), have an open deck bounded at the perimeter with walls and a tailgate. In use, this deck is covered by canvas or soft vinyl-coated fabric secured (via snap lock fastenings, elastic loops, or the like) about the upper edges of the walls surrounding the deck. These types of covers have a problem in that they can collect rainwater at their center, causing them to sag in the middle. Furthermore, over time, the appearance of the cover degrades through prolonged exposure to incremental weather and sunlight.

As an alternative, many manufacturers of utility vehicles, or manufacturers of accessories made to the original equipment manufacturer (OEM) standards, provide rigid covers that cover the truck bed. These rigid covers do not have the sagging problem that can be observed in soft covers. While rigid covers made from a single shell are known, these have to be sufficiently over-engineered to withstand the stresses of use, particularly when items such as tools and construction materials are placed on top of the cover, as is sometimes known to occur. This over-engineering of single shell rigid covers has a consequent effect on their portability and expense to the consumer.

More commonly, rigid covers are typically formed from molded fiberglass or plastic material and are formed from two shells—one inner shell and one outer shell. The inner shell, which faces the deck of the utility vehicle with which it is being used, helps provide support for the outer shell, which faces upwards, and thus is exposed to the weather. This type of structure is preferred to ensure that the overall structural integrity of the cover is not compromised. Furthermore, the use of molded fiberglass or plastic material gives the user greater control of the overall appearance of the cover. Users can select a cover that better complements the color or shape of their vehicle. Furthermore, the use of these materials, as opposed to canvas or vinyl-coated fabric, also means that the cover retains its appearance for a longer period of time when exposed to incremental weather and sunlight.

An example of such a cover is described in U.S. Pat. No. 6,547,310. This patent generally discusses a cover that is formed from a textured outer layer, vacuum formed to a specific shape, with an inner support layer that includes a number of support ribs. Both the outer and inner layers are formed from plastic acrylonitrile butadiene styrene (ABS) sheets.

However, these two- or dual shell rigid covers have some problems. One significant problem is that of thermal expansion of the respective shells when exposed to extreme temperatures. When the inner and outer shells expand or contract at different rates, this stresses the joins between the two. Over time, the bonds and connectors linking the inner and outer shell may deteriorate and break down. As the inner shell is necessary for support of the outer shell, the overall structural integrity of the rigid cover is compromised and it may need to be repaired or replaced.

A further disadvantage of dual shell covers is that if an aftermarket OEM accessory such as a sports bar is to be used, this greatly complicates installation. The sports bar is not typically fitted to the cover itself as doing so can inhibit the range of motion when it is being opened. Instead, rigid covers intended for use with sport bars come in multiple parts; a main body, which is the portion that is raised and lowered, and two smaller parts for either side of the deck. The latter parts are fixed and do not tilt, and the sports bar can be secured to these parts. This arrangement is more expensive to manufacture and complicates installation to the utility vehicle.

Accordingly, it is an object of some embodiments of the present invention to address the foregoing problems or at least to provide the public with a useful choice. Further aspects and advantages of some embodiments of the present invention will become apparent from the ensuing description, which is given by way of example only.

SUMMARY

Certain embodiments of the present invention may provide solutions to the problems and needs in the art that have not yet been fully identified, appreciated, or solved by current utility vehicle cover technologies. For instance, in some embodiments, a rigid cover may be used over the top of the deck of a utility vehicle. The cover may be formed from a single shell of thermoplastics material and reinforced with an extrusion that, by virtue of being formed in aluminum or another suitable material, has a lower co-efficient of expansion relative to the shell. The two parts of the cover, shell and extrusion, may be secured in such a way that there can be some degree of independent movement between them. Effectively, limited thermal expansion of the shell is allowed without overly compromising the connection between it and the aluminum extrusion. A flexible extrusion may connect the cover to the utility vehicle at one end and act as a hinge such that as it is raised, it is not only displaced in a vertical orientation, but also in a horizontal direction. The rigid cover may improve the structural integrity of a single shell rigid cover, allow for thermal expansion of the single shell rigid cover relative to its stiffening members, allow for lateral displacement of the cover as it is opened, and/or at the very least, offer the public a useful choice.

In an embodiment, a cover for a utility vehicle includes a rigid shell, a reinforcing extrusion, and at least one fastener comprising a shaft passing through an aperture in the reinforcing extrusion to secure it to the shell. The shell is configured with a channel for the reinforcing extrusion. The channel includes a base with an aperture for the shaft of the fastener. The aperture of the shell is larger than the shaft of the fastener.

In another embodiment, a cover for a utility vehicle includes a rigid shell that includes a first end configured to be connected to the utility vehicle. The cover also includes a flexible extrusion that connects the cover to the utility vehicle via the first end.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
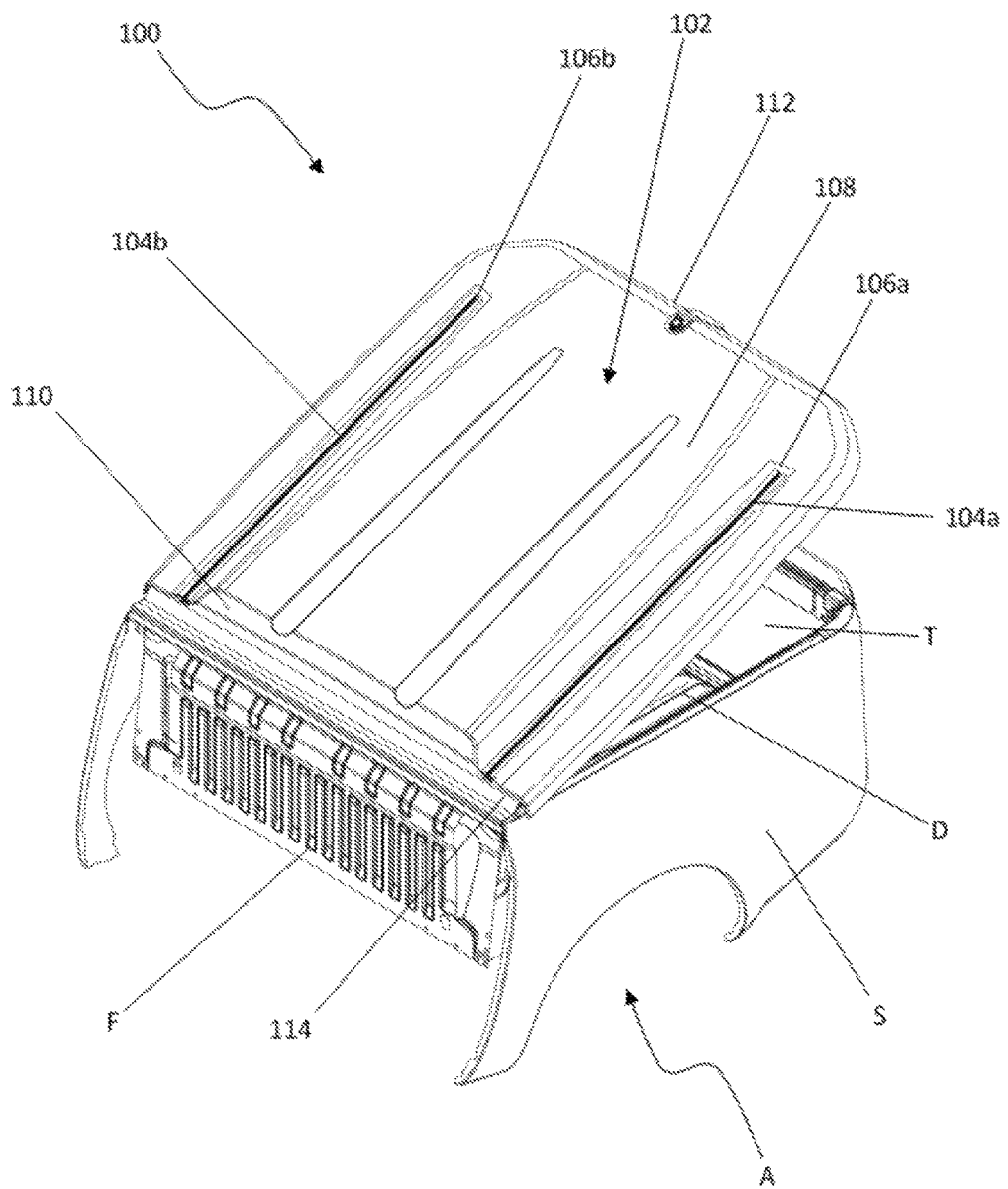
FIG. 1 is a top perspective view of an embodiment of the invention.

In some embodiments, a cover for a utility vehicle includes a rigid shell, a reinforcing extrusion, and at least one fastener having a shaft passing through an aperture in the reinforcing extrusion to secure it to the shell. The rigid shell may be configured with a channel for the reinforcing extrusion, where the channel has a base with an aperture for the shaft of the fastener and the aperture of the shell is larger than the shaft of the fastener. The rigid cover may be used over the top of the deck of a utility vehicle. In certain embodiments, a method of manufacturing a cover for a utility vehicle includes forming a shell for the cover, where the shell has a channel with a base provided with an aperture for the shaft of a fastener. The method also includes placing a reinforcing extrusion, having an aperture for a fastener, within the channel and passing a fastener through the apertures of the reinforcing extrusion and the base of the channel and securing same. The aperture of the base of the channel is complementary to the shaft of the fastener and the aperture of the shell is larger than the shaft of the fastener.

In some embodiments, the cover is formed from a single shell of thermoplastics material and reinforced with an extrusion that, by virtue of being formed from aluminum, has a lower coefficient of expansion relative to the shell. The two parts of the cover, shell and extrusion, may be secured in such a way that there can be some degree of independent movement between them. Effectively, limited thermal expansion of the shell is allowed without overly compromising the connection between the shell and the aluminum extrusion.

It will be understood that the deck of the utility vehicle may have a base that is bounded at its perimeter with upright walls and a tailgate. The perimeter of the cover may engage with the top edges of the walls and tailgate, covering the interior of the deck. The cover may include a rigid shell that forms the main portion of the cover. This rigid shell shall now be referred to throughout the remainder of the specification as a shell.

In certain embodiments, the shell is manufactured or formed from a robust and durable material for rigidity and strength. In some embodiments, the shell is manufactured or formed from thermoplastic materials. The thermoplastic material may be ABS, which is readily available and relatively inexpensive to source. ABS also may be provided in a range of aesthetically pleasing finishes. However, this is not meant to be limiting, and other types of materials that may suffer from a degree of thermal expansion may be readily used for forming the shell without deviating from the scope of the invention, as will be appreciated by a person of ordinary skill in the art. For example, the fiberglass or the like may be used, and it is also contemplated that aluminum and plastic laminate may be used to form the shell.

In some embodiments of the invention, the shell is rotationally molded using conventional molding techniques readily apparent to a person of ordinary skill in the art. However, this is not meant to be limiting and other appropriate manufacturing techniques may be employed without deviating from the scope of the invention. The dimensions of the shell may ultimately depend on the dimensions of the deck of the utility vehicle with which the given embodiment is to be used.

The shell should also be understood to have a first end. In some embodiments of the invention, this is the front end of the cover that, in use, corresponds with the end of the deck adjacent the passenger compartment of the utility vehicle. The shell should also be understood to have a second end that opposes the first end. In certain embodiments of the invention, this is the rear end of the cover that, in use, corresponds with the tailgate of the utility vehicle.

Typically, the shell is a four-sided polygon in a plan view, with two sides defined by the front and rear ends. The remaining two sides correspond to the side walls of the deck. The shell will be understood to have an elongate dimension and a width dimension. The elongate dimension is that running from the front end to the rear end of the cover while the width dimension runs between the remaining sides of the cover. The shell should also be understood to have an upper surface and a lower surface. The latter shall now be referred to as the underside of the cover. It will be appreciated that in use, it is the upper surface that faces upwards and is exposed to the weather. The underside of the shell faces the deck.

The shell in some embodiments is configured with at least one channel running substantially between the front and rear end, i.e., running the elongate dimension of the cover. This channel is for the reinforcing extrusion of the cover. In certain embodiments of the invention, the channel is molded into the upper surface of the shell. This means that the reinforcing extrusion to be located within the channel is visible externally when the cover is installed on the utility vehicle. However, in other embodiments, the channel may be molded into the underside of the shell, and this has the advantage of hiding the reinforcing element from view (but may also place additional stress on the shell as the weight of the extrusion is effectively suspended from its underside).

While the shell has only one channel in some embodiments, it will be appreciated that this may compromise the integrity of the cover. In certain embodiments, the shell is provided with at least two or more channels, spaced inwardly of the sides of the shell. In some embodiments, the shell may include more than two channels. For example, as well as two channels running the length of the cover, one or more channels may be provided running the width of the cover, and intersecting the existing channels. This means that a one-piece reinforcing extrusion may be used even when two channels run the length of the shell.

The width of the channel will ultimately depend on the dimensions of the reinforcing extrusion to be placed therein in some embodiments. It may be preferable to have the channel closely approximate the dimensions of the reinforcing extrusion for a more aesthetically pleasing appearance. Each channel will be understood to be defined by side walls, a base and an upwards facing mouth. The base defines the bottom of the channel.

As noted above, the cover includes a reinforcing extrusion to be located within the channel of the shell in some embodiments. This should be understood to be a rigid member that, when fitted, provides structural integrity and strength to the cover. The reinforcing extrusion may be of a material having a low coefficient of thermal expansion relative to the materials from which the shell is formed.

In some embodiments of the invention, the reinforcing extrusion is formed from a metal such as aluminum. This type of metal is relatively easy to source and work with. Although reference shall now be made to the reinforcing extrusion being made from aluminum, persons of ordinary skill in the art will appreciate that in some embodiments, the reinforcing extrusion could be formed from another material having a suitably low coefficient of thermal expansion without deviating from the scope of the invention.

The reinforcing extrusion may be a substantially tubular or cylindrical elongate member with a circular or square cross-section. However, this is not meant to be limiting, and in some embodiments, the extrusion takes a U-shaped profile, the base of the U corresponding with the base of the channel in the shell. In other embodiments, the reinforcing extrusion may be relatively flat and thus formed from a solid length of suitable metal rather than being hollow.

It will be appreciated by persons of ordinary skill in the art that the dimensions of the reinforcing extrusion will ideally substantially approximate those of the channel of the shell. This is so that there is little opportunity for larger debris and detritus, such as leaves or the like, to settle in the spaces between the reinforcing extrusion and the sides of the channel. In some embodiments, it may be ideal for the reinforcing extrusion, once fitted into the channel, to be at least flush with the shell such that it does not sit proud of the upper surface of the shell. However, this is not essential, and for aesthetic reasons, in some embodiments, the reinforcing extrusion may extend slightly higher than the depth of the channel.

In other embodiments, the reinforcing extrusion may include a shallow recess or the like into which, once the extrusion has been located within the channel of the shell, a length of plastic trim or similar may be inserted. This may improve the overall aesthetic appearance of the cover. The recess may be in the form of a C-channel, and thus provides the functionality for OEM accessories to be attached directly to the cover using the C-channel.

Along the length of both the reinforcing extrusion and the channel in the shell, a plurality of apertures for fasteners may be provided. The fasteners may be any suitable fastener configured for the purpose, but one that includes a head and a shaft in some embodiments. Reference shall now be made to the fastener being a bolt, although it will be appreciated that screws, rivets, or any other suitable fastener may also potentially be used without deviating from the scope of the invention.

On the underside of the shell, the fastener may be held in place with a cooperating fastener, which in the case of a bolt may be a nut. It will be appreciated that the diameter of the nut needs to be greater than that of the apertures where they open onto the underside of the shell. In some embodiments, the surface area of the co-operating fastener may be increased through the use of a washer or the like.

In some embodiments, the underside of the cover may be provided with a secondary elongate extrusion or plate. This may help provide an adequate surface area to allow sufficient torqueing force between the fastener and the extrusion. This secondary elongate extrusion or plate should be understood to be a rigid member that, when fitted, provides structural integrity and strength to the underside of the cover.

The secondary elongate extrusion or plate may be of a material having a low coefficient of thermal expansion relative to the materials from which the shell is formed. In some embodiments of the invention, the secondary elongate extrusion or plate is formed from a metal such as aluminum. As noted above with respect to the reinforcing extrusion, metals such as aluminum are relatively easy to source and work. However, the secondary elongate extrusion or plate could be formed from another material having a suitably low coefficient of thermal expansion without deviating from the scope of the invention. The secondary elongate extrusion or plate may take a number of configurations depending on the profile of the underside of the cover with which it is to be used. The secondary elongate extrusion or plate could be substantially tubular or cylindrical, but may alternatively be relatively flat.

In some embodiments, ring-like seals may be used between the shaft of the fastener and the extrusions to help prevent or minimize egress of rainwater. The apertures in the channel should be understood to be larger than the diameter of the shaft of the fastener, although not greater than the diameter of the head of the fastener (or its co-operating fastener) to ensure that the fastener cannot pass through the shell. Having the apertures in the channel larger than the shaft of the fastener means that the shell, being formed from thermoplastics material in some embodiments that may expand and contract in response to high temperatures, is able to move slightly relative to the fastener. This places less stress on the connection between the shell and fastener. However, the apertures in the reinforcing extrusion may be substantially complementary to the diameter of the shaft of the fastener such that there is relatively little tolerance between the two. Being made from materials having a low coefficient of thermal expansion, the extrusion does not expand and contract to the same degree as the shell. Thus, the connection between the fastener and extrusion is less likely to become weak or otherwise degraded over time.

In some embodiments of the invention, the apertures in one or both of the reinforcing extrusion and shell may be bounded with a spacer. The spacer, constructed from a suitable metal such as steel or the like, is dimensioned such that it has a smaller diameter than the apertures of the channel of the shell, and includes a central aperture through which the shaft of the fastener may pass. This allows the extrusion to be torqued tightly to the cooperating fastener (or washer or secondary extrusion/plate if present) and can help with the integrity of the connection between the components of the cover while still allowing the shell to move slightly relative to the fastener and reinforcing extrusion.

According to another embodiment, a cover for a utility vehicle includes a rigid shell. The shell includes a first end configured to be connected to the utility vehicle. A flexible extrusion connects the cover to the utility vehicle via the first end. According to an embodiment, a method of manufacturing a cover for a utility vehicle includes forming a shell for the cover. The shell has a first end. The method also includes forming a flexible extrusion to connect the cover to the utility vehicle and securing the flexible extrusion to the first end of the shell.

In some embodiments, the cover is connected to the utility vehicle at one end by way of a flexible extrusion, preferably made of rubberized material in some embodiments, which acts as a hinge such that as it is raised, it is not only displaced in a vertical orientation but in a horizontal direction as well. This helps provide additional clearance for any fittings, such as sport bars, that may be fitted to the cover. It allows for drainage of rainwater away from the interior of the deck to which the cover is fitted as it is opened. It also does away with conventional D-seals that would otherwise be required (and which add expense to manufacture and installation).

It will be understood that the deck of the utility vehicle has a base that is bounded at its perimeter with upright side walls, and upright front wall abutting the passenger compartment of the vehicle, and a tailgate. The perimeter of the cover engages with the top edges of the walls and tailgate, thereby covering the interior of the deck. It will be appreciated that the dimensions of the shell may ultimately depend on the dimensions of the deck of the utility vehicle with which some embodiments are to be used. The shell will be understood to have an elongate dimension and a width dimension. The elongate dimension is that running from the front end to the rear end of the cover, while the width dimension runs between the remaining sides of the cover, assuming that it is a four-sided polygon in a plan view. The shell should also be understood to have an upper surface (facing upwards) and a lower surface (facing the deck). The latter shall now be referred to as the underside of the cover.

The shell of the cover may be formed from a single layer of thermoplastics material such as described above. Reference shall now be made to the cover being formed from a single shell, but persons of ordinary skill in the art will appreciate that this is not meant to be limiting, and some embodiments may be used with rigid covers formed from two or more shells like more conventional rigid covers that lack reinforcing extrusions. The shell should also be understood to have a first end. In some embodiments of the invention, this is the front end of the cover, which corresponds with the front wall of the deck. The opposing end of the shell is the rear end and this should be understood to be the portion of the cover that corresponds with the tailgate of the utility vehicle. The shell is secured to the utility vehicle with a flexible extrusion in some embodiments.

In use, the cover is lifted or raised at its rear end and this is expected to be the most common configuration for the cover. Thus, in some embodiments of the present invention, the first end of the shell is secured to the utility vehicle with the flexible extrusion. However, in some embodiments, it is possible that the first end of the cover corresponds with the tailgate of the vehicle and it is the end proximate the passenger compartment that is lifted. This then means that the shell is secured to the vehicle with the flexible extrusion at the rear end. In yet another embodiment, the flexible extrusion runs the side of the shell and thus the cover is pivoted about the side of the vehicle in use.

The flexible extrusion should be understood to be a relatively elongate strip of flexible material, which is substantially planar. The selection of material for forming the flexible extrusion is important. The material should be capable of temporary and repeated deformation (when the cover is opened and closed), but also be able to return to its original shape. In some embodiments, the flexible material is formed from rubberized plastics material. This material may be a thermoplastic elastomer blend, but it should be appreciated that this is not meant to be limiting.

Along its elongate dimension, the flexible extrusion should be understood to have first and second portions either side of a mid-portion. Due to the deformable nature of the material used to fabricate the flexible extrusion, the mid-portion effectively provides a hinge about which the first and second portions may pivot.

Each of the first and second portions include an outer edge. This will be understood to mean the free edges of the flexible extrusion. In some embodiments, the outer edges may be reinforced with a strip of additional material bonded thereto, such as heavy duty plastics material or even a length of metal.

In some embodiments, one of the first and second portions is folded back upon at least a part of the other portion about the mid-portion of the flexible extrusion. It will be appreciated that this means that in one state, i.e., when the cover is closed, the width of the flexible extrusion is less than when it is in a second state, i.e. when the cover is open. This is an important aspect of some embodiments, as shall be discussed below.

In some embodiments, the length of the flexible extrusion substantially corresponds with the width of the cover. In certain embodiments of the invention, the outer edge of the first portion of the flexible extrusion is bonded or otherwise secured to the underside of the shell. This may be achieved through the use of industrial strength adhesives, VELCRO™, industrial strength double sided tape, or any other suitable securing material or mechanism without deviating from the scope of the invention. The outer edge of the second portion is secured to the vehicle. Likewise, this may be secured to the vehicle using industrial strength adhesives, VELCRO™, industrial strength double sided tape, or any other suitable securing material or mechanism without deviating from the scope of the invention.

In some embodiments of the present invention, the rubber extrusion may include a protrusion or the like along the second portion intended to be secured to the vehicle. In such embodiments, the protrusion may fit in to a corresponding channel or recess along the top of the walls of the bed of the vehicle with which it is to be used. These channels may be provided in the walls of the vehicle as manufactured or, in some embodiments, may be provided in aftermarket OEM guard or protection elements that are used to protect the top edges of the walls.

The use of a flexible extrusion to form the hinge of the cover is advantageous as, because of one of the portions being folded back upon the other, the width of the flexible extrusion changes as the cover is opened and closed. This means that as the cover is opened, some lateral horizontal displacement of the cover is allowed. This provides sufficient clearance for any accessories mounted to the shell, such as an OEM sports bar or the like.

Furthermore, when opened, the mid-portion of the flexible extrusion forms a channel-like structure into which liquid, such as rain water, may drain and be directed towards the sides of the vehicle with which some embodiments are to be used. As the cover is closed, this drain is effectively closed by virtue of the mid-portion effectively collapsing upon itself, dispersing any liquid that may be residing within. It also reduces or eliminates the requirement for conventional seals, such as D-seals, that would be otherwise required across the front wall of the deck.

Some embodiments provide a number of advantages over conventional covers including, but not limited to: (1) improving the structural integrity of a single shell rigid cover; (2) allowing for thermal expansion of the single shell rigid cover relative to its stiffening members; (3) allowing for lateral displacement of the cover as it is opened; and/or (4) at the very least, offering the public a useful choice.

An embodiment of the present invention in the form of a cover generally indicated by arrow (100) for the deck (D) of a utility vehicle (A—only rear portion shown for sake of clarity), is illustrated in FIG. 1. The deck is defined by a front wall (F), side walls (S—only one side wall visible in this view), and a tailgate (T). The cover (100) is formed from a shell (102) of thermoplastics material, preferably ABS in some embodiments, and reinforcing extrusions (104a, 104b) for structural integrity and strength.

A pair of channels (106a, 106b) are provided along the upper surface (108) of the shell (102). These channels run substantially from the front end (110) of the shell, which in use will substantially abut the rear of the passenger compartment (not visible) and front wall (F) of the utility vehicle (A), to its rear end (112) located proximate the tailgate (T) of the utility vehicle.

The reinforcing extrusions (104a, 104b), which preferably are formed from aluminum in some embodiments, are located within the channels (106a, 106b). Being made from aluminum, the extrusions have a relatively low coefficient of thermal expansion relative to the shell (102) which, as noted above, is formed from thermoplastics material. The cover (100) is connected to the front wall (F) via a flexible extrusion (114), which acts as a hinge. This allows lateral displacement of the cover as it is opened from a closed state, moving the entire cover slightly towards to the tailgate (T) end of the deck (D).

Figure 2:
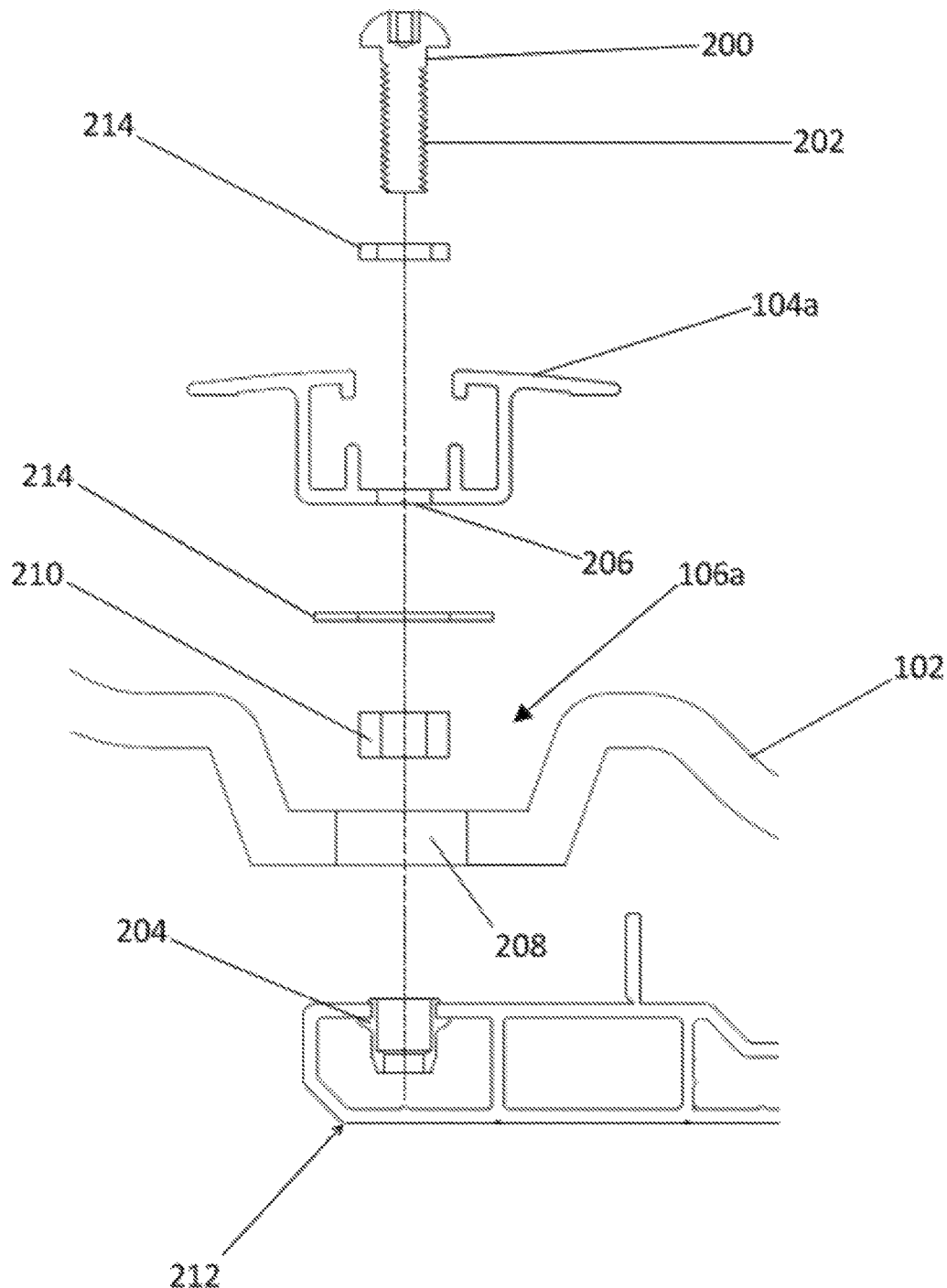
FIG. 2 is a partial cross-sectional end view of the embodiment of FIG. 1.

Turning now FIG. 2, a portion of one of the aluminum extrusions (104a) and the shell (102) is shown in a partial cross-sectional end view. It can be seen that the extrusion takes a substantially U-shaped cross-section with flanges for a smoother appearance. Its depth corresponds substantially with the depth of the channel (106a) so once installed it sits largely flush within.

The aluminum extrusion (104a) is secured to the shell (102) through the use of a fastener (200), in this case a bolt (but screws may also be used), having a threaded shaft (202) and secured with co-operating locking means such as a nut (204). To achieve this, an aperture (206) is provided through the base of the aluminum extrusion. Similarly, an aperture (208) is also provided in the channel (106a) of the shell (102) for the shaft (202) of the bolt (200) to pass through.

The aperture (208) provided in the shell (102) is oversized, and thus has a greater diameter relative to the shaft (202) of the bolt (200). The purpose of this is to allow for the thermal expansion of the shell as it swells and contracts, in response to changes in temperature, relative to the aluminum extrusion (104a). In contrast, the aperture (206) of the extrusion (104a) closely approximates the diameter of shaft of the bolt.

A spacer (210), through which the shaft (202) of the bolt (200) passes in use, is positioned within the aperture (208) of the channel (106a). This provides a surface against which the bolt can be torqued tightly as so to prevent deformation of the shell (102) about its aperture. A second extrusion (212) is provided on the underside of the shell (102) for added structural integrity. It will be seen that this second extrusion (212) is substantially a box-like construction into which the nut (204) for the bolt (200) is pre-positioned for ease of assembly. However, the second extrusion could be simple elongate plate structure if desired to reduce materials. To prevent or minimize egress of water penetrating through the shell (102) about the shaft (202) of the bolt (200), suitably dimensioned seals (214) may be used between the respective components.

Figure 3A:
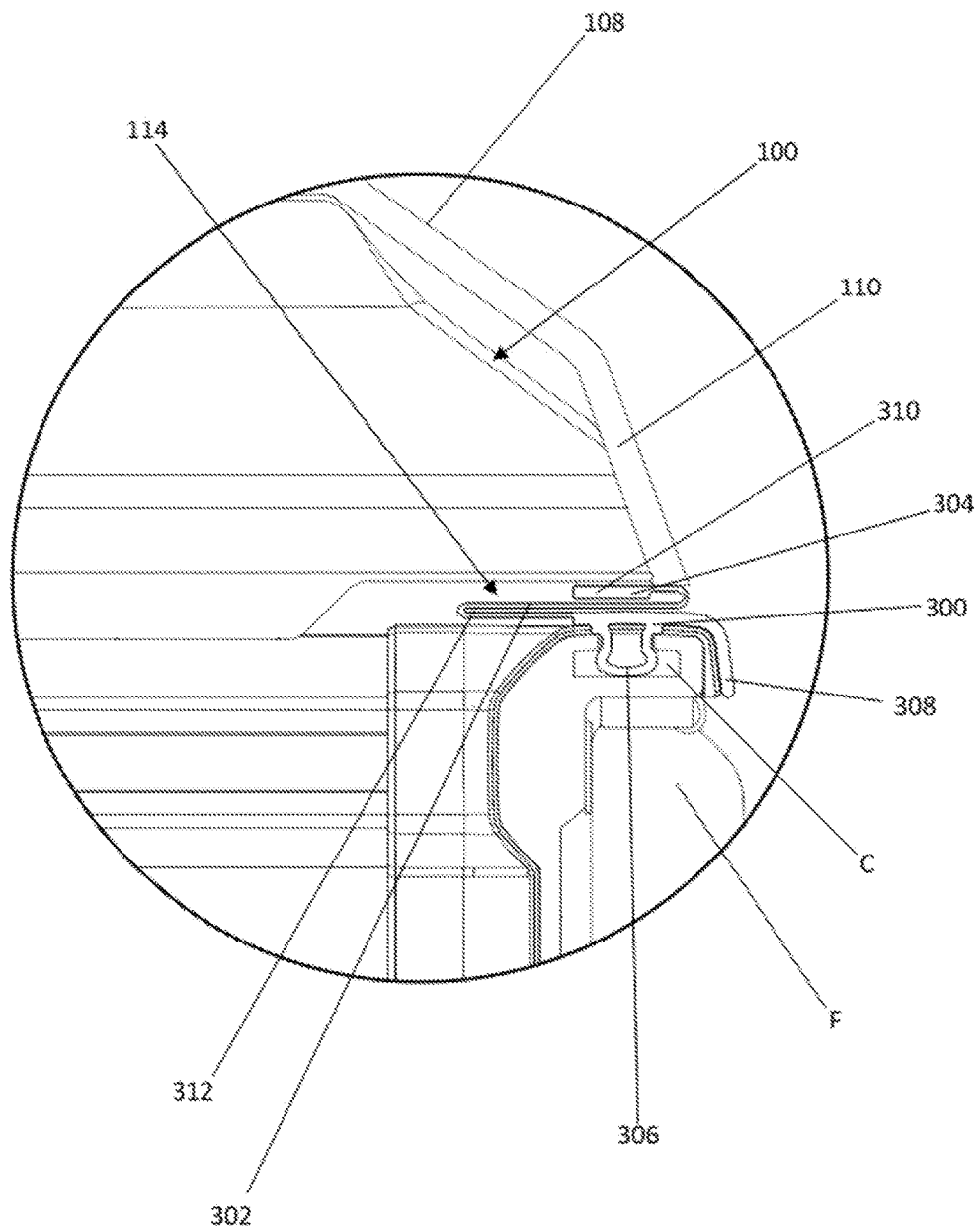
FIG. 3a is a side view of a second exemplary embodiment of the invention in a closed state.
Figure 3B:
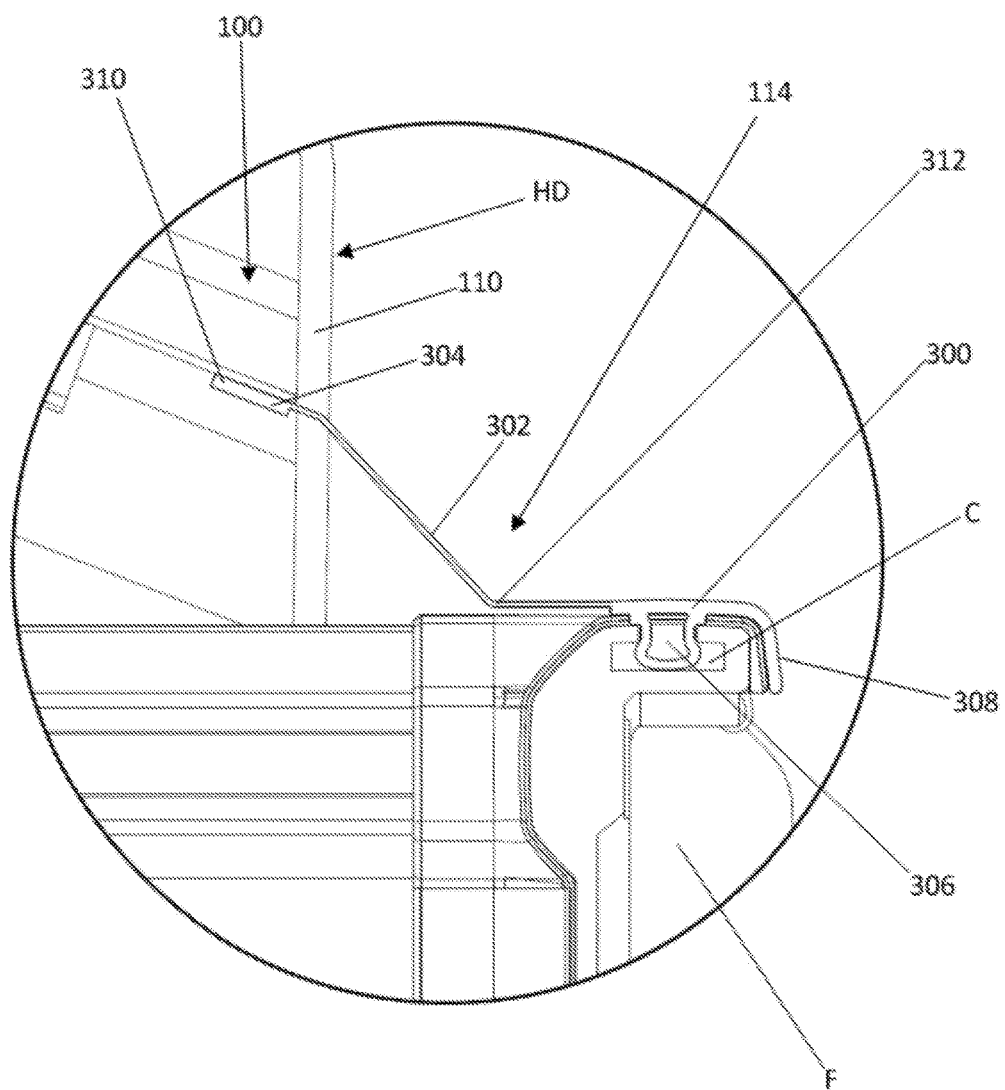
FIG. 3b is a side view of the embodiment of FIG. 3a in an open state.

FIGS. 3a and 3b are side views of the front end (110) of the cover (100) as it is secured to the front wall (F) of the vehicle by way of the flexible extrusion (114) that acts as a hinge and shall be referred to as such for the purpose of this description. This hinge (114), which in this view is seen end on, is a length of profiled rubber and spans the width dimension of the cover (100) when installed. It has three main portions that can be loosely described as a first portion (300), a mid-portion (302) and a second portion (304).

In FIG. 3a, it will be appreciated that the hinge (114) has effectively been folded upon itself. Along the underside of the first portion (300), a protrusion (306) is provided. This keys into a complementary channel (C) along the upper edges of front wall (F).

For extra integrity, the connection between the first portion (300) and the front wall (F) may be improved by using adhesive at the extreme outer edge (308) and the front wall. The other edge portion (304) is folded back across the mid-portion (302) of the hinge. The outer edge (312) of this portion is bonded to the underside of the cover (100).

Referring now to FIG. 3b, which shows the cover (100) in an open state, it will be seen that the mid-portion of the hinge (300) defines a channel (312) into which liquid, such as rain water, may drain as it runs off the upper surface (108—visible only in FIG. 3a) of the cover. The hinge (114) also allows for horizontal displacement of the cover (100) in the direction of arrow HD as it is opened. The extent of the displacement is constrained by the presence of the gas struts (not shown) that support and hold open the cover as it is raised. This horizontal displacement (HD) is useful as it provides clearance between any accessories (not shown) mounted on the upper surface (108) of the cover (100), such as a sports bar (not shown), and the passenger compartment (not shown) of the utility vehicle to which the cover is mounted.

The invention may also be said broadly to consist in the parts, elements and features referred to or indicated in the specification of the application, individually or collectively, in any or all combinations of two or more of said parts, elements or features.

Aspects of the present invention have been described by way of example only and it should be appreciated that modifications and additions may be made thereto without departing from the scope thereof as defined in the appended claims.

Throughout this specification, the word "comprise", or variations thereof such as "comprises" or "comprising", will be understood to imply the inclusion of a stated element, integer or step, or group of elements integers or steps, but not the exclusion of any other element, integer or step, or group of elements, integers or steps.

All references, including any patents or patent applications cited in this specification, are hereby incorporated by reference. No admission is made that any reference constitutes prior art. The discussion of the references states what their authors assert, and Applicant reserves the right to challenge the accuracy and pertinency of the cited documents. It will be clearly understood that, although a prior U.S. patent is referred to herein, this patent does not constitute an admission that it forms part of the common general knowledge in the art in the United States, New Zealand, or any other country.

It will be readily understood that the components of various embodiments of the present invention, as generally described and illustrated in the figures herein, may be arranged and designed in a wide variety of different configurations. Thus, the detailed description of the embodiments of the present invention, as represented in the attached figures, is not intended to limit the scope of the invention as claimed, but is merely representative of selected embodiments of the invention.

The features, structures, or characteristics of the invention described throughout this specification may be combined in any suitable manner in one or more embodiments. For example, reference throughout this specification to "certain embodiments," "some embodiments," or similar language means that a particular feature, structure, or characteristic described in connection with the embodiment is included in at least one embodiment of the present invention. Thus, appearances of the phrases "in certain embodiments," "in some embodiment," "in other embodiments," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

The invention claimed is:

1. A cover for a utility vehicle, comprising:
   a rigid shell;
   a reinforcing extrusion; and
   at least one fastener comprising a shaft passing through an aperture in the reinforcing extrusion to secure it to the shell, wherein
   the shell is configured with a channel for the reinforcing extrusion,
   the channel comprises a base with an aperture for the shaft of the fastener, and
   the aperture of the shell is larger than the shaft of the fastener.

2. The cover of claim 1, wherein the shell is manufactured or formed from thermoplastic materials.

3. The cover of claim 1, wherein the reinforcing extrusion is manufactured or formed from a material having a lower coefficient of expansion relative to the shell.

4. The cover of claim 3, wherein the reinforcing extrusion is manufactured or formed from aluminum.

5. The cover of claim 1, wherein the reinforcing extrusion has a U-shaped profile.

6. The cover of claim 1, wherein
   the shell comprises a first end and an opposing second end, and
   the shell comprises an elongate dimension running from the first end to the second end.

7. The cover of claim 6, wherein the channel for the reinforcing extrusion runs substantially the length of the elongate dimension of the shell.

8. The cover of claim 1, wherein the reinforcing extrusion is dimensioned to approximate the channel.

9. The cover of claim 7, wherein
   the shell comprises an upper side and a lower side, and
   the channel is formed into the upper side.

10. The cover of claim 9, wherein the lower side of the cover is provided with a secondary elongate extrusion or plate.

11. The cover of claim 10, wherein the secondary elongate extrusion or plate is manufactured or formed from a material having a lower coefficient of expansion relative to the shell.

12. The cover of claim 11, wherein the secondary elongate extrusion or plate is manufactured or formed from aluminum.

13. The cover of claim 1, wherein the fastener comprises a bolt having a head and a shaft.

14. The cover of claim 13, wherein
   the aperture of the shell is larger than the diameter of the shaft of the bolt, but less than the diameter of the head of the bolt, and
   the aperture of the reinforcing extrusion is substantially complementary to the diameter of the shaft of the bolt.

15. The cover of claim 1, wherein the cover comprises a spacer for the aperture of the shell, the spacer comprising an aperture passing therethrough for the shaft of the fastener.

* * * * *